US010114486B2

(12) United States Patent
Edwards et al.

(10) Patent No.: US 10,114,486 B2
(45) Date of Patent: Oct. 30, 2018

(54) METHOD AND APPARATUS FOR PROVIDING TOUCH INPUT VIA A TOUCH SENSITIVE SURFACE UTILIZING A SUPPORT OBJECT

(71) Applicant: Change Healthcare Holdings, LLC, Nashville, TN (US)

(72) Inventors: Cliff Edwards, Delta (CA); Allan Noordvyk, Surrey (CA)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 724 days.

(21) Appl. No.: 14/031,282

(22) Filed: Sep. 19, 2013

(65) Prior Publication Data
US 2015/0077348 A1    Mar. 19, 2015

(51) Int. Cl.
*G06F 3/041*       (2006.01)
*G06F 3/0354*    (2013.01)

(52) U.S. Cl.
CPC ............ *G06F 3/041* (2013.01); *G06F 3/0354* (2013.01); *G06F 3/03543* (2013.01)

(58) Field of Classification Search
CPC ..... G06F 3/041; G06F 3/0354; G06F 3/03543
See application file for complete search history.

(56) References Cited

U.S. PATENT DOCUMENTS

| 7,030,861 | B1* | 4/2006 | Westerman | G06F 3/04883 |
| | | | | 345/173 |
| 8,612,641 | B1* | 12/2013 | Bozarth | G06F 3/0227 |
| | | | | 710/15 |
| 2005/0062718 | A1* | 3/2005 | Hinckley | G06F 3/0317 |
| | | | | 345/163 |
| 2008/0046425 | A1* | 2/2008 | Perski | G06F 3/04883 |
| 2008/0159088 | A1* | 7/2008 | Simmons | G06F 3/0317 |
| | | | | 369/44.14 |
| 2008/0161086 | A1* | 7/2008 | Decre | A63F 3/02 |
| | | | | 463/14 |
| 2008/0297476 | A1* | 12/2008 | Hotelling | G06F 21/32 |
| | | | | 345/163 |
| 2009/0322352 | A1* | 12/2009 | Zachut | A63F 3/00643 |
| | | | | 324/658 |
| 2010/0328211 | A1* | 12/2010 | Norieda | G06F 3/011 |
| | | | | 345/157 |
| 2011/0191680 | A1* | 8/2011 | Chae | G06F 3/0436 |
| | | | | 715/716 |
| 2011/0215914 | A1 | 9/2011 | Edwards | |

(Continued)

*Primary Examiner* — Jose Soto Lopez
(74) *Attorney, Agent, or Firm* — Alston & Bird LLP

(57) ABSTRACT

Methods and a support object are provided to facilitate the receipt of a wide variety of touch inputs from a user, such as in a manner that is comfortable and does not fatigue the user. In the context of a method, touch input is received from a user who engages and moves a support object relative to a touch sensitive surface. The method also includes receiving the touch input from the user via the touch sensitive surface. The method further includes determining a relative position of the touch input with respect to the support object and then determining a type of touch input based upon the relative position of the touch input with respect to the support object. The method also includes causing an action to be taken in response to the type of touch input. Corresponding apparatus and computer program products are also provided.

14 Claims, 9 Drawing Sheets

(56) References Cited

U.S. PATENT DOCUMENTS

| | | | |
|---|---|---|---|
| 2011/0216015 A1 | 9/2011 | Edwards | |
| 2012/0005624 A1* | 1/2012 | Vesely | G06F 3/012 715/808 |
| 2012/0007817 A1* | 1/2012 | Heatherly | G06F 3/0416 345/173 |
| 2012/0062490 A1* | 3/2012 | Heatherly | A63F 13/02 345/173 |
| 2012/0068964 A1* | 3/2012 | Wright | G06F 3/03545 345/174 |
| 2012/0105362 A1* | 5/2012 | Kremin | G06F 3/03545 345/174 |
| 2013/0027299 A1* | 1/2013 | Tsukahara | G06F 1/1694 345/157 |
| 2013/0127719 A1* | 5/2013 | Yasutake | G06F 3/033 345/163 |
| 2013/0194200 A1* | 8/2013 | Zanone | G06F 3/0418 345/173 |
| 2013/0206831 A1* | 8/2013 | Basler | G06F 17/30002 235/375 |
| 2013/0257729 A1* | 10/2013 | Edwards | G06F 3/044 345/163 |
| 2013/0257777 A1* | 10/2013 | Benko | G06F 3/03545 345/173 |
| 2013/0300696 A1* | 11/2013 | Haran | G06F 3/041 345/173 |
| 2014/0043279 A1* | 2/2014 | Pedersen | G06F 3/0416 345/174 |
| 2014/0062895 A1* | 3/2014 | Chakra | G06F 3/03545 345/173 |
| 2014/0098041 A1* | 4/2014 | Ji | G06F 3/0488 345/173 |
| 2014/0267089 A1* | 9/2014 | Smith | G06F 3/04883 345/173 |
| 2014/0347311 A1* | 11/2014 | Joharapurkar | G06F 3/044 345/174 |
| 2015/0177858 A1* | 6/2015 | Lee | G06F 3/0414 345/163 |

* cited by examiner

METHOD AND APPARATUS FOR PROVIDING TOUCH INPUT VIA A TOUCH SENSITIVE SURFACE UTILIZING A SUPPORT OBJECT

TECHNOLOGICAL FILED

An example embodiment of the present invention relates generally to the provision of touch input via a touch sensitive surface and, more particularly, to the provision of touch input via a touch sensitive surface utilizing a support object to reduce user fatigue or discomfort.

BACKGROUND

Users interact with computing devices for a wide variety of purposes, both professional and personal. For example, radiologists frequently interact with and control medical image diagnostic work stations in order to view patient images. In this and other settings, users frequently sit in front of their computer display with their forearms and hands resting upon the desk or other work surface upon which the computer display and/or various input devices such as a keyboard, a mouse and/or a touch sensitive surface are placed. In this pose, a user is prepared to provide input via the keyboard, via the mouse or via a touch sensitive surface that may also be supported by the desk or other support surface.

A computer mouse is useful for the control of a cursor or the like upon a graphical user interface and, as such, is useful for tracking and pointing applications. However, a computer mouse does not generally permit user input in the form of expressive gestures. Instead, in addition to the user input provided via movement of the computer mouse, user input provided via a computer mouse is generally provided by the user's actuation of the left and right mouse buttons and/or the user's actuation of a scroll wheel. In addition to the constraints upon the form of user input provided via a computer mouse, frequent interaction with a computer mouse may cause discomfort or fatigue as a result of the tight grasp that some users maintain upon the computer mouse in order to move the mouse, click the mouse buttons and/or roll the scroll wheel.

In order to allow for more expressive gestures, multi-touch and stylus-capable touch tablets and track pads have been introduced. Although the touch tablets and track pads are configured to receive and interpret a wider array of gestures as acceptable forms of user input, some users may interact with touch tablets and track pads by raising their hand from the underlying support surface, such as the desk, upon which the touch tablet or track pad rests such that only one or more of their fingertips contact the touch sensitive surface of the touch table or track pad. Over an extended period of use, a user may become fatigued or otherwise experience discomfort associated with having to maintain their hand in a raised position while providing the touch input. Other users may interact with touch tablet and track pads by sliding the heel of their hand along the desk or other surface upon which the touch tablet or track pad rests while permitting one or more of their fingertips to touch the touch sensitive surface of the touch tablet or track pad, thereby limiting their range of input and potentially creating at least some discomfort.

BRIEF SUMMARY

Methods and a support object are provided according to example embodiments of the present invention in order to facilitate the receipt of touch input from a user. In this regard, the methods and support object of an example embodiment permit a user to provide touch input in a manner that is comfortable and does not fatigue the user. Additionally, the method and support object of some embodiments permit a wide variety of touch input to be provided in order to correspondingly provide a plurality of control options to the user.

In one embodiment, a method is provided for receiving touch input from a user who engages and moves a support object relative to a touch sensitive surface. The method of this embodiment includes receiving the touch input from the user via the touch sensitive surface. The method also includes determining a relative position of the touch input with respect to the support object and determining, with processing circuitry, a type of touch input based upon the relative position of the touch input with respect to the support object. The method also includes causing an action to be taken in response to the type of touch input.

The method of one embodiment may also include determining an orientation of the support object. In this embodiment, the method may determine the relative position of the touch input based upon the orientation of the support object. In one embodiment, the method may receive the touch input by receiving an initial touch input followed by movement of the touch input over the touch sensitive surface as a result of corresponding movement of the support object. The method of one embodiment may receive a touch input that is comprised of touch input components concurrently provided by two or more fingers of the user upon the touch sensitive surface.

In another embodiment, a method of identifying a type of support object upon a touch sensitive surface is provided that includes receiving an input from a plurality of contact points of the support object via the touch sensitive surface. The method of this embodiment determines the relative positions of the contact points of the support object in order to define a signature of the support object. In this regard, the support object is one of a plurality of types of support objects with each type of support object having differently positioned contact points that define a different signature. The method of this embodiment also identifies, with processing circuitry, the type of support object based upon the signature of the support object.

The method of one embodiment also includes receiving touch input from a user via the touch sensitive surface, determining a type of touch input based upon the relative position of the touch input with respect to a support object and causing an action to be taken in response to the type of touch input. In this embodiment, the method may also include determining an orientation of the support object based upon the relative positions of the contact points. As such, the method of this embodiment may determine the type of touch input based upon the relative position of the touch input with respect to the support object and its orientation. The method of one embodiment may also include receiving touch input via a touch surface carried by the support object and causing an action to be taken in response to the touch input. In one embodiment in which the support object includes a scroll device, the method may also include receiving input via the scroll device of the support object and causing an action to be taken in response to the input via the scroll device.

Corresponding apparatus and computer program product are also provided for performing the foregoing embodiments of the methods. In this regard, an apparatus comprising processing circuitry may be configured to perform the foregoing embodiments of the methods. Additionally, a computer program product is provided that includes a non-transitory computer-readable storage medium having program code portions stored thereon with the program code portions configured, upon execution by the processing circuitry, to cause the foregoing embodiments of the methods to be performed.

In a further embodiment, a support object is provided that is configured to be identified by a touch sensitive surface. The support object of this embodiment includes a first surface configured to be engaged by a user, a second surface that is opposite the first surface and a plurality of contact members extending outwardly from the second surface. The plurality of contact members include a first set of at least three contact members that define a first signature of the support object and a second set of at least three contact members that define a second signature of the support object. The first and second sets of contact members each include at least one contact member that is different than the contact members of the other set of contact members. A plurality of contact members are configured such that only one of the first and second sets of contact members contacts the touch sensitive surface at any instance.

The first and second sets of contact members of one embodiment define respective triangular configurations having different dimensions. The first set of contact members may include at least one contact member that is in common with the second set of contact members. In one embodiment, the second surface comprises a convex surface. For example, the convex surface may include a plurality of faces, including first and second faces, positioned at an angle relative to one another. In this embodiment, one or more of the first set of contact members extend outwardly from the first face and one or more the second set of contact members extend outwardly from the second face. In one embodiment in which the plurality of contact members include a plurality of sets of at least three contact members including the first and second sets of contact members, the plurality of sets of contact members may be positioned in a spiral configuration.

BRIEF DESCRIPTION OF THE SEVERAL VIEWS OF THE DRAWINGS

Figure 1:
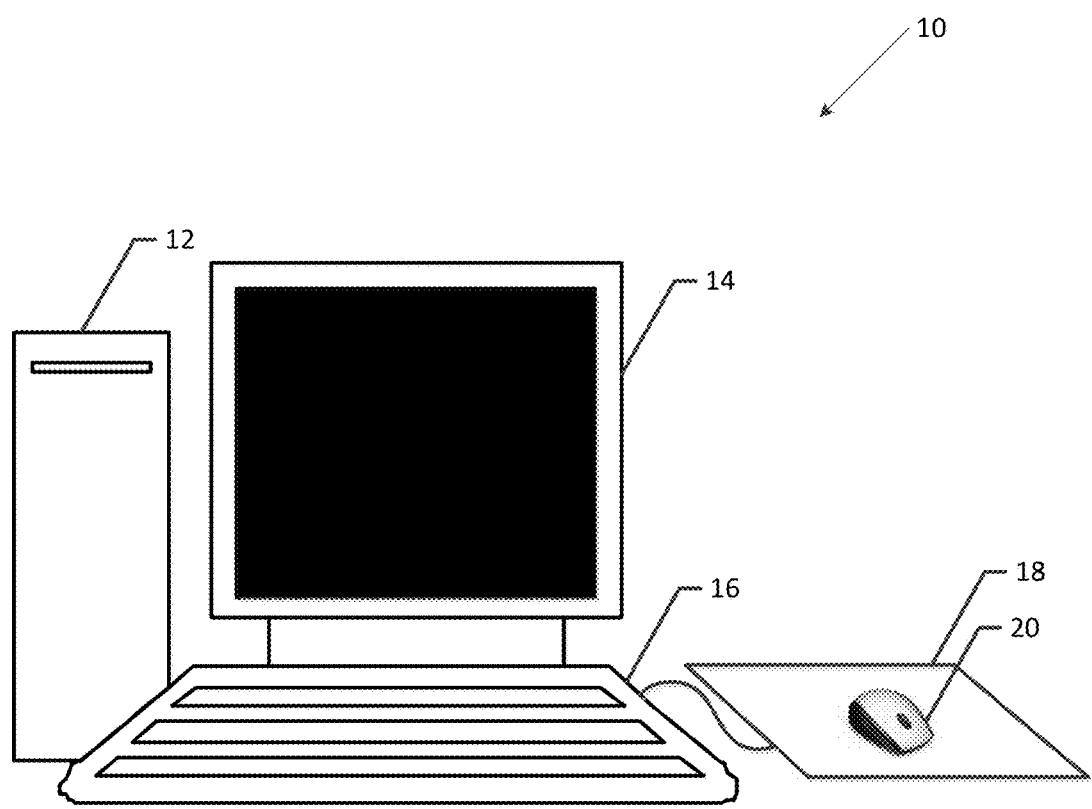
Figure 2:
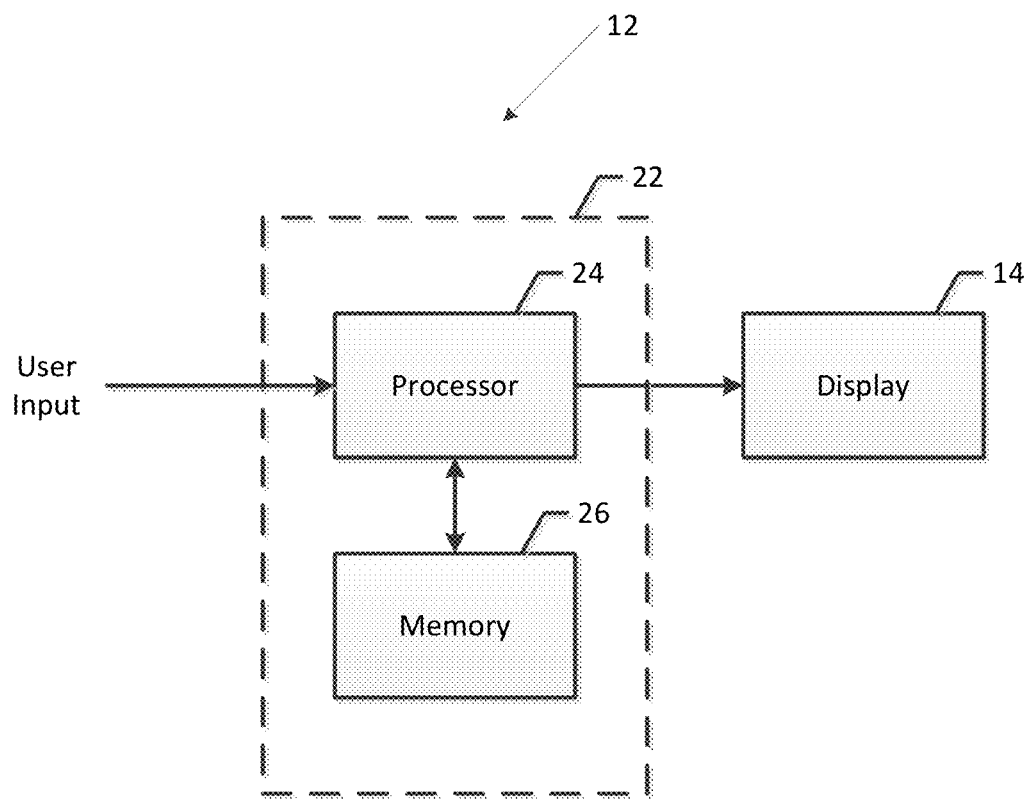
Figure 3:
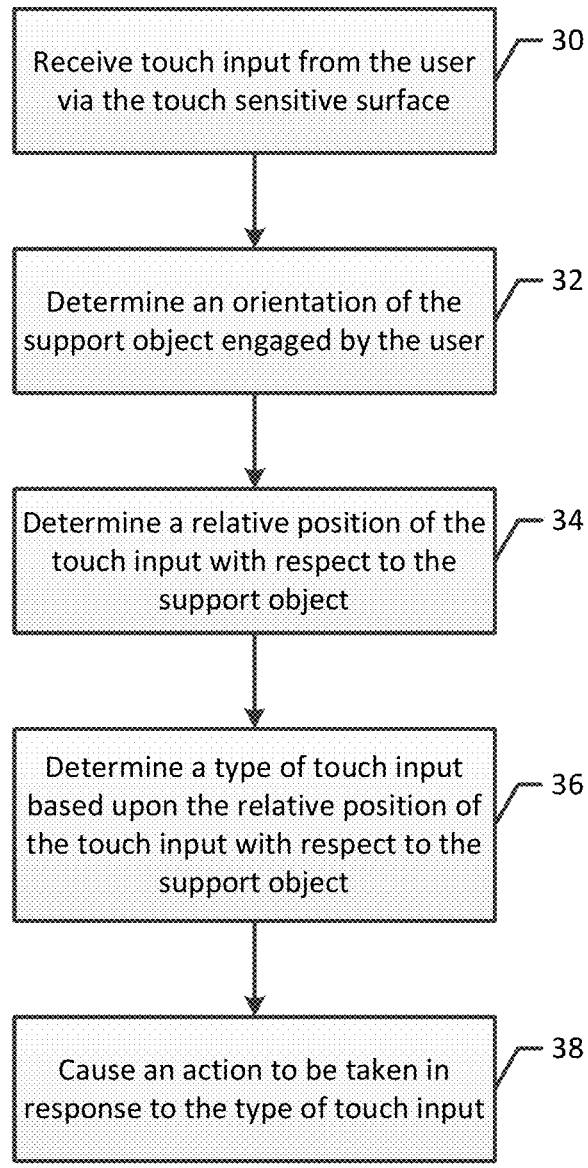
Figure 4A:
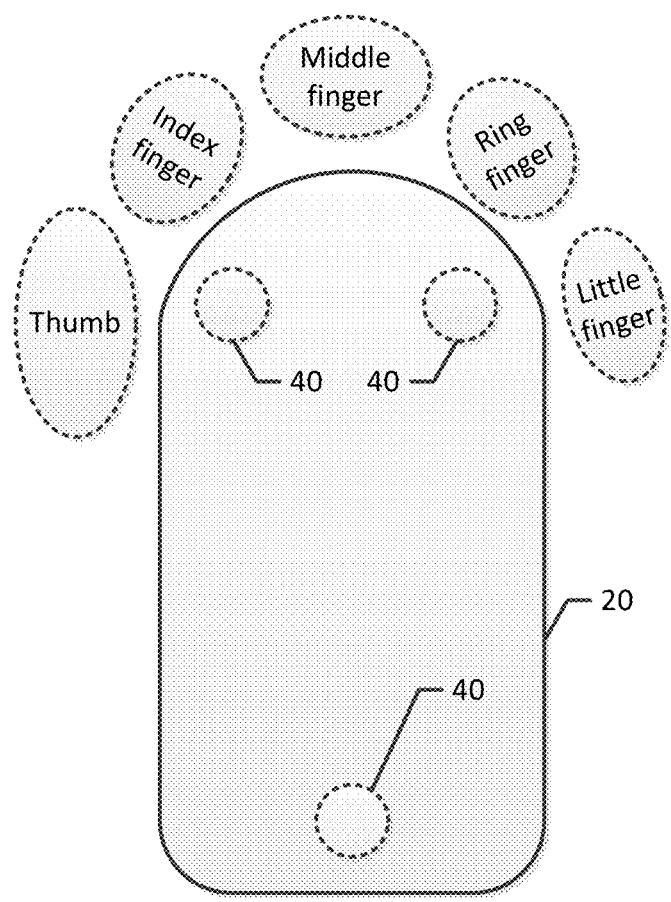
Figure 4B:
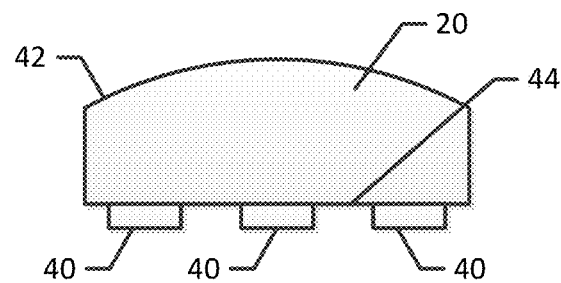
Figure 5:
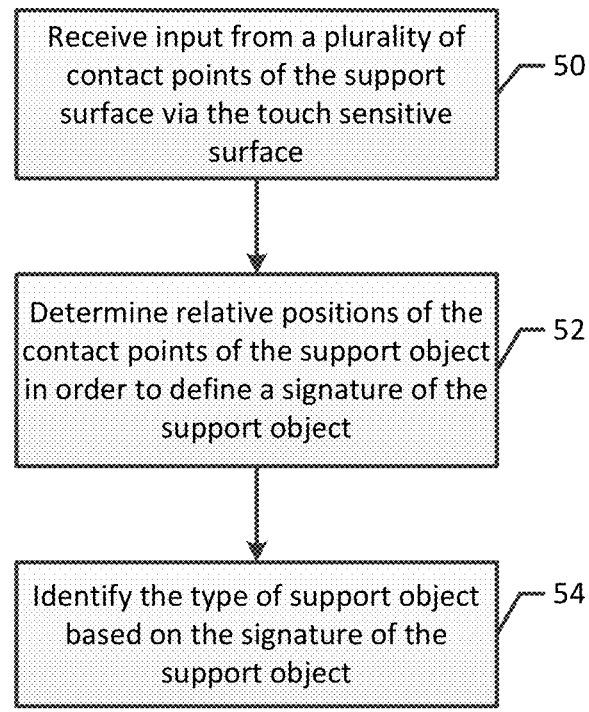
Figure 6A:
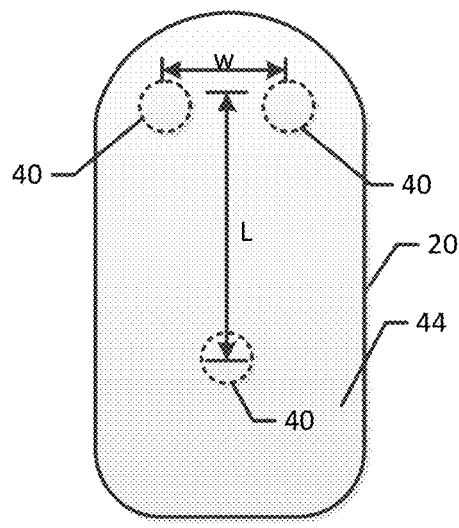
Figure 6B:
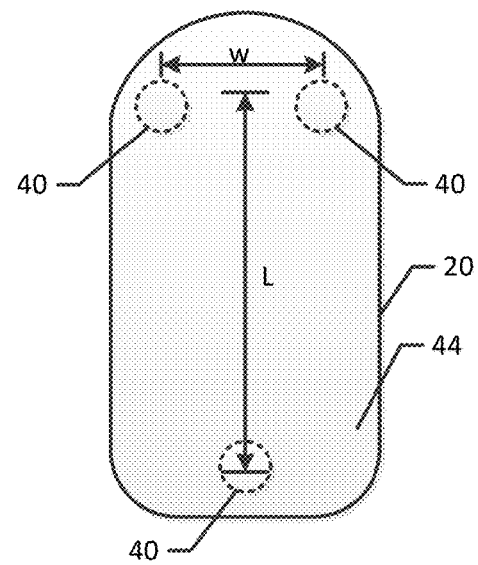
Figure 6C:
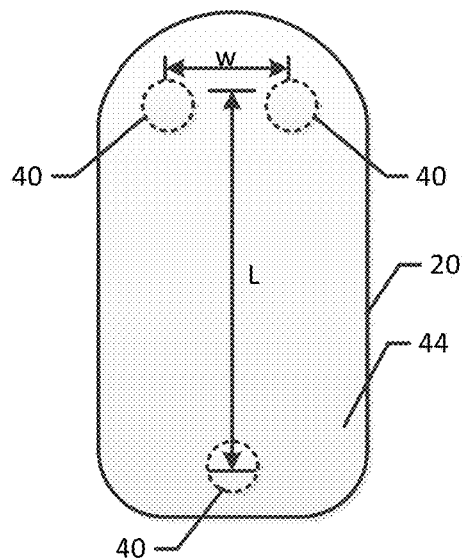
Figure 6D:
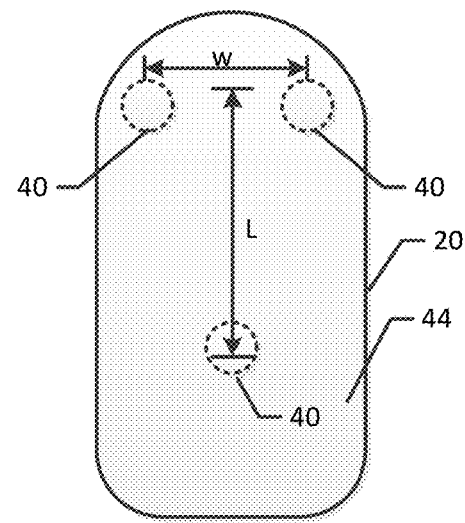
Figure 7A:
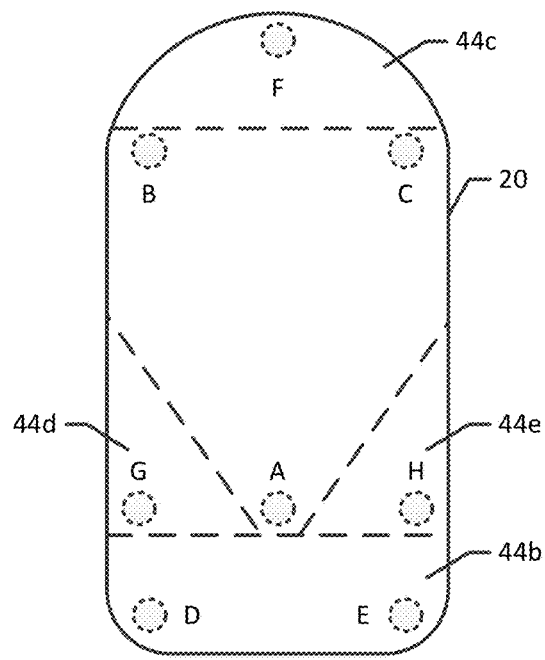
Figure 7B:
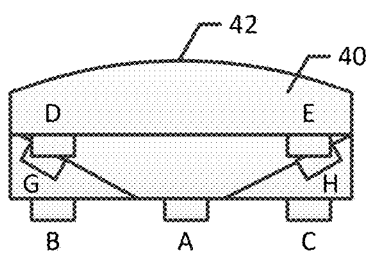
Figure 7C:
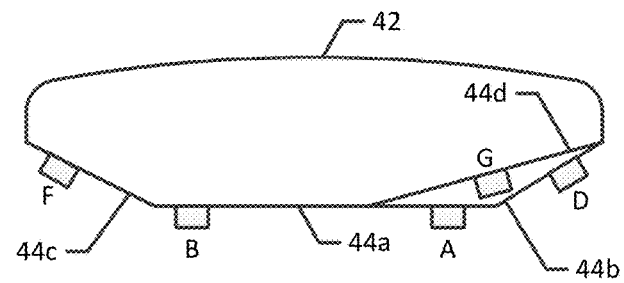
Figure 8:
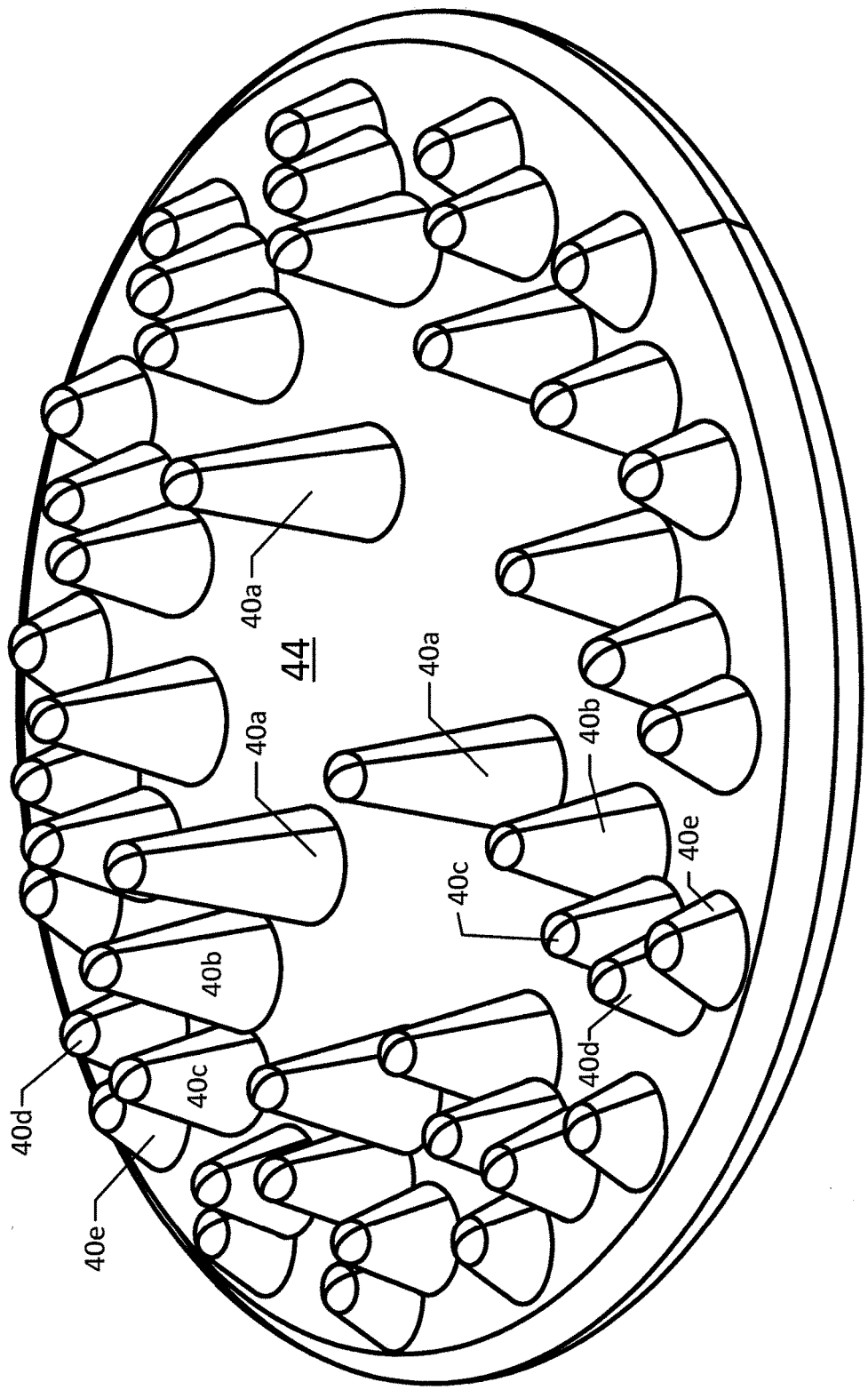
Figure 9:
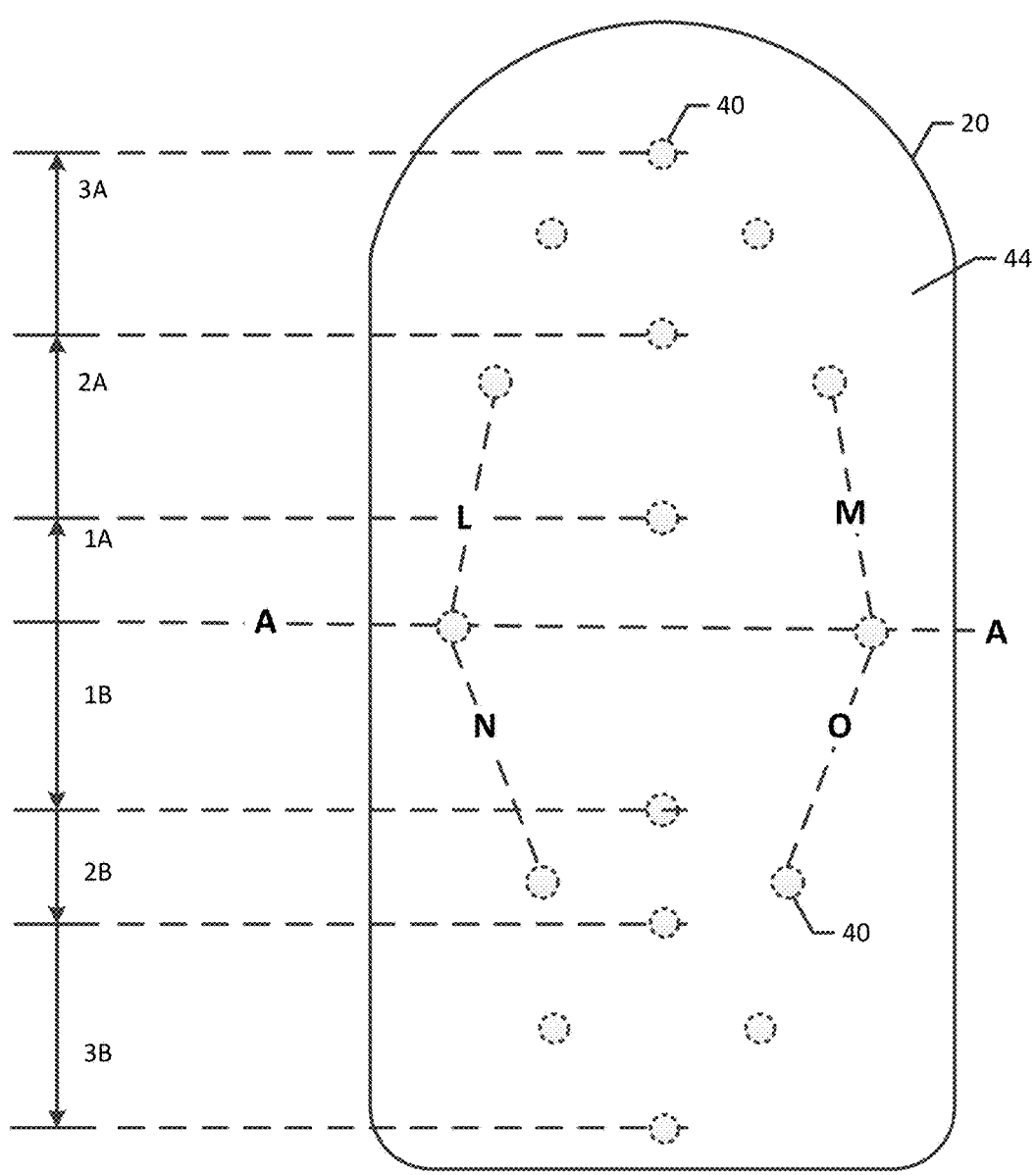

Having thus described embodiments of the invention in general terms, reference will now be made to the accompanying drawings, which are not necessarily drawn to scale, and wherein:

FIG. 1 is a perspective view of a computer system including a touch sensitive surface and a support object resting thereupon that may be specifically configured in order to receive user input in accordance with an example embodiment of the present invention;

FIG. 2 is a block diagram of a computing device including processing circuitry that may be specifically configured in accordance with an example embodiment of the present invention;

FIG. 3 is a block diagram of the operations that may be performed, such as by the processing circuitry of FIG. 2, in accordance with an example embodiment of the present invention;

FIGS. 4a and 4b are a plan view and an end view, respectively, of a support object that may be utilized in accordance with an example embodiment of the present invention;

FIG. 5 is a flow chart illustrating operations performed, such as by the processing circuitry of FIG. 2, in accordance with another embodiment of the present invention;

FIG. 6a-6d are plan views of different types of support objects having different signatures as defined by the configuration of the contact members in accordance with an example embodiment of the present invention;

FIG. 7a-7c are a plan view, an end view and a side view, respectively, of a support object having a plurality of contact members extending outwardly from a plurality of faces of the second surface in accordance with another example embodiment of the present invention;

FIG. 8 is a schematic view of a plurality of contact members that may be configured to define a plurality of different types of support objects in accordance with yet another example embodiment of the present invention; and FIG. 9 is a plan view of a support object having a plurality of contact members extending outwardly from a plurality of faces of the second surface in accordance with yet another example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Further, the apparatus and method of example embodiments of the present invention will be primarily described in conjunction with medical-imaging applications. It should be understood, however, that the apparatus and method may be utilized in conjunction with a variety of other applications, both in the medical industry and outside the medical industry. Like numbers refer to like elements throughout.

Users may provide input to a computer system in a wide variety of manners and for a wide variety of purposes. By way of example, embodiments of the present invention will be hereinafter described in conjunction with a Picture Archiving and Communication System (PACS) that may be utilized by radiologists and other healthcare professionals in order to review various images of a patient for diagnostic and other purposes. However, embodiments of the present invention may be correspondingly utilized in order to provide user input to other types of computer systems utilized for other purposes, both within and outside of the healthcare industry.

Regardless of the purpose for which the user input is provided, one example of a computer system 10 that may be specifically configured in accordance with an embodiment to the present invention is illustrated in FIG. 1. As shown, the computer system may include a computing device 12 configured to provide the functionality described herein as well as to provide other more conventional computer functionality. A computer system may also include an output device, such as a display 14, and an input device, such as a keyboard 16. However, other types of input and output devices may be provided including touchscreen displays and the like in which the input and output devices are combined into a single user interface. In accordance with an example embodiment of the present invention, the computer system may also include a touch sensitive surface 18. As shown, the touch sensitive surface may be positioned upon a desk or other work surface so as to be readily accessible to the user of the computer system. The touch sensitive surface may, in one embodiment, be disposed in a horizontal orientation, but the touch sensitive surface may be disposed to another orientation, if so desired. The computer system may include various types of touch sensitive surfaces including surfaces that include a force sensing resistor (FSR) matrix, a surface capacitance sensing matrix or other type of point contact sensing technology.

Regardless of the type of touch sensitive surface 18, the touch sensitive surface is configured to detect user input provided by operative content with the touch sensitive surface. In this regard, operative contact may include both physical, direct contact with the touch sensitive surface, such as in an instance in which the touch sensitive surface includes an FSR matrix, and proximate contact with the touch sensitive surface, such as in an instance in which the touch sensitive surface includes a capacitive sensing matrix that detects a change in the capacitive field as a result of the presence of an input device, such as a capacitive screen stylus, in proximity to the touch sensitive surface even though direct physical contact is not necessarily established therebetween. The touch sensitive surface of one embodiment may be configured to concurrently detect touch input comprised of touch input components concurrently provided by the operative contact of a plurality of different contact points, such as two or more fingers, upon the touch sensitive surface, thereby providing multi-touch input capability. Based upon the user input, the touch sensitive surface may be configured to provide information regarding the user input, such as information regarding the contact point(s) at which the user has operatively contacted the touch sensitive surface, to the computing device 12 such that an appropriate action may be taken in response thereto. Although examples of the actions that may be taken in response to user input via a touch sensitive surface will be described below, these actions are provided by way of example and not of limitation as the computing device may be configured to provide a wide variety of different actions in response to the user input via the touch sensitive surface depending upon, for example, the application executed by the computing device to which the user is providing input.

As shown in FIG. 1 and as described below, a support object 20 may be placed upon the touch sensitive surface 18 and then may be moved thereabout by the user. A support object may be configured in various manners, but, in one embodiment, has the physical configuration of a computer mouse. However, even in an instance in which the support object has the physical configuration of a computer mouse, the support object need not include or provide the functionality of a computer mouse, such as with respect to pointing and tracking functionality, as described below. For example, the support object may be a computer mouse with at least the mouse buttons disabled. The support object includes a support surface 42, generally facing away from the touch sensitive surface, upon which a user may rest a portion of their hand, such as the palm of their hand, during the provision of user input. By resting their hand upon the support surface of the support object, a user may move or otherwise manipulate the support object with respect to the touch sensitive surface in a manner that allow the user's arm to remain relatively relaxed and to be subjected to little fatigue or discomfort, even in instances in which the user utilizes the support object to provide input via the touch sensitive surface for an extended period of time. As described below, the support object may also include a second surface 44, opposite the support surface, and a plurality of contact elements extending outwardly therefrom for establishing contact with the touch sensitive surface.

Although certain components of the computer system 10 with which embodiments of the present invention may be employed were described above in conjunction with FIG. 1, reference is now made to FIG. 2 which illustrates certain of those components and provides for a more detailed description thereof. In this regard, FIG. 2 illustrates a block diagram of a computing device 12 in accordance with some example embodiments. The computing device may be embodied by one or more servers, computer workstations, desktop or laptop computers or the like. For example, in conjunction with a PACS system, the computing device may be embodied by a computer workstation that may be utilized by a radiologist or other healthcare professional to review one or more images of a patient. However, the computing device may be employed in other applications, both inside and outside the healthcare industry. As described below, the computing device may be configured to implement and/or otherwise support implementation of various example embodiments. However, it should be noted that the components, devices or elements illustrated in and described with respect to FIG. 2 below may not be mandatory and thus some may be omitted in certain embodiments. Additionally, some embodiments may include further or different components, devices or elements beyond those illustrated in and described with respect to FIG. 2.

The computing device 12 may include or otherwise be in communication with processing circuitry 22 that is configurable to perform actions in accordance with one or more example embodiments disclosed herein. In this regard, the processing circuitry may be configured to perform and/or control performance of one or more functionalities of the computing device in accordance with various example embodiments, and thus may provide means for performing functionalities of the computing device. The processing circuitry may be configured to perform data processing, application execution and/or other processing and management services according to one or more example embodiments.

In some example embodiments, the processing circuitry 22 may include a processor 24 and, in some embodiments, such as that illustrated in FIG. 2, may further include memory 26. The processing circuitry may be configured to receive user input. The user input may be provided via various user interface mechanisms including, for example, a computer mouse, a touch screen display, a joystick, a keyboard 16 and/or a touch sensitive surface 18 as discussed herein. Additionally, the processing circuitry may be configured to communicate with a display 14, such as to present information including, for example, a graphical user input.

The processing circuitry 22 may be embodied as a circuit chip (e.g., an integrated circuit chip) configured (e.g., with hardware, software or a combination of hardware and software) to perform operations described herein. As noted above, in one embodiment, the processing circuitry includes a processor 24, which may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor may comprise a plurality of processors. The plurality of processors may be in operative communication with each other and may be collectively configured to perform one or more functionalities of the computing device 12 as described herein. The plurality of processors may be embodied on a single computing device or distributed across a plurality of computing devices collectively configured to function as the computing device. In some example embodiments, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform one or more operations described herein.

In some example embodiments, the memory 26 may include one or more non-transitory memory devices such as, for example, volatile and/or non-volatile memory that may be either fixed or removable. In this regard, the memory may comprise a non-transitory computer-readable storage medium. It will be appreciated that while the memory is illustrated as a single memory, the memory may comprise a plurality of memories. The plurality of memories may be embodied on a single computing device or may be distributed across a plurality of computing devices collectively configured to function as the computing device 12. The memory may be configured to store information, data, applications, instructions and/or the like for enabling the computing device to carry out various functions in accordance with one or more example embodiments. For example, the memory may be configured to buffer input data for processing by the processor 24. Additionally or alternatively, the memory may be configured to store instructions for execution by the processor. As yet another alternative, the memory may include one or more databases that may store a variety of files, contents or data sets. Among the contents of the memory, applications may be stored for execution by the processor in order to carry out the functionality associated with each respective application. In some cases, the memory may be in communication with one or more of the processor via a bus or buses for passing information among components of the computing device including, for example, the display 14.

Having now described a computing device 12 that may be configured to implement and/or support implementation of various example embodiments, features of several example embodiments will be described. It will be appreciated that the following features are non-limiting examples of features provided by some example embodiments. Further, it will be appreciated that embodiments are contemplated within the scope of the disclosure that implement various subsets or combinations of the features further described herein. Accordingly, it will be appreciated that some example embodiments may omit one or more of the following features and/or implement variations of one or more of the following features.

Referring now to block 30 of FIG. 3, the computing device 12, such as the processing circuitry 22, the processor 24 or the like, may be configured to receive touch input from the user via the touch sensitive surface. In this regard, the user may place their hand upon the support object 20 and then move the support object about the touch sensitive surface 18. In one embodiment, the touch input is provided by operative contact established between one or more fingers of the user's hand that rests upon the support object and the touch sensitive surface. In this regard, a portion of the user's fingers, such as at least the user's fingertips, extend beyond the support object so as to overlie the touch sensitive surface. In order to provide touch input, the user may move one or more of their fingers into contact with the touch sensitive surface while the palm of the user's hand continues to rest upon the support object.

The computing device 12, such as the processing circuitry 22, the processor 24 or the like, may be configured to perform various actions in response to the touch input. Additionally, the actions to be taken may vary depending upon the type of touch input, such as depending upon which individual finger provided the touch input or which combination of fingers provided the touch input. Additionally, the computing device, such as the processing circuitry, the processor or the like, may be configured to perform different actions depending upon whether the touch input is stationary relative to the touch sensitive surface or whether the touch input moves relative to the touch sensitive surface, such as in an instance in which the user provides touch input at a first location upon the touch sensitive surface and then moves the support object with their hand continuing to rest thereupon while maintaining contact between one or more of their fingers and the touch sensitive surface.

In order to determine which one or more of the user's fingers has provided the touch input, the computing device 12, such as the processing circuitry 22, the processor 24 or the like, may be configured to determine the orientation of the support object 20 engaged by the user, such as by resting the user's hand thereupon. In order to determine the orientation of the support object, the computing device, such as the processing circuitry, the processor or the like, may be configured to determine the positions of the contact elements 40 of the support object upon the touch sensitive surface 18. As shown in FIGS. 4a and 4b, the support object may include at least three contact elements that extend outwardly from the second surface 44 of the support object and are configured to make operative contact with the touch sensitive surface at respective contact points. The construction of the contact elements may depend upon the type of touch sensitive surface that is to be engaged with the contact elements constructed such that contact points between the contact elements and the touch sensitive surface may be registered or recognized by the touch sensitive surface. As such, in an instance in which the touch sensitive surface includes an FSR matrix, the contact elements may be formed of the same or a different material than that which forms the housing of the support element, such as a plastic material, in order to establish the physical contact necessary to be recognized by the touch sensitive surface. For example, the contact elements of this embodiment may be formed of a hard plastic and may have the shape of a domed button so as to create relatively low friction and to have relatively low wear. Alternatively, in an instance in which the touch sensitive surface includes a capacitance sensing matrix, the contact elements may be formed of a material that interacts with a capacitive field, such as the same material that forms the tip of a of a capacitive screen stylus such that the contact elements will be recognized by the capacitance sensing matrix. Regardless of the construction, the contact elements may have various profiles or shapes including relatively flat or blunt tips or relatively rounded tips.

Although the support object 20 may include more than three contact elements 44, the support object includes at least three contact elements such that the support object is supported upon the touch sensitive surface 18 in a stable manner. Regardless of the number of contact elements, the contact elements are positioned in a pattern that is asymmetrical relative to the forward portion of the support object, such as the portion of the support object beyond which the user's fingers extend, and the rearward portion of the support object, such as the portion of the support object from which the user's wrist and forearm extends. As such, the computing device 12, such as the processing circuitry 22, the processor 24 or the like, is configured to determine the orientation of the support object based upon a consideration of the locations at which the contact elements make operative contact with the touch sensitive surface and the predefined configuration of the contact elements. See block 32 of FIG. 3. In regards to the example depicted in FIGS. 4a and 4b, two contact elements are positioned proximate the forward end of the support object, while one contact element is positioned proximate the rearward end of the support object at a location in a widthwise direction that is between the two contact elements that are proximate the forward end of the support object. Thus, by consideration of the relative locations of the contact elements upon the touch sensitive surface in comparison to the predefined configuration of the contact elements that is known to the computing device, such as the memory device 26, the computing device, such as the processing circuitry, the processor or the like, may be configured to determine the orientation of the support object including, for example, the location of the forward end of the support object relative to the rearward end of the support object.

In one embodiment, the computing device 12, such as the processing circuitry 22, the processor 24 or the like, may be configured to determine the orientation of the support object 20 by determining, for example, the center line (in the widthwise direction) of the support object that extends between the forward and rearward ends of the support object. In this regard, the computing device, such as the processing circuitry, the processor or the like, may have previously received and stored the predefined configuration of the contact elements 44 of the support object, such as the arrangement of the contact elements with two contact elements proximate the forward end of the support object and one contact element proximate the rearward end of the support object as well as the spacing between the contact elements both in a widthwise and a lengthwise direction such that the computing device may construct a representation of the center line of the support object based upon the contact points upon the touch sensitive surface 18 with which the contact elements make operative contact.

Based upon the orientation of the support object 20, the computing device 12, such as the processing circuitry 22, the processor 24 or the like, may be configured to determine a relative position of the touch input with respect to the support object. See block 34 of FIG. 3. For example, the computing device, such as the processing circuitry, the processor or the like, may be configured to determine whether the touch input was to the left of the support object, to the right of the support object, forward of the support object or the like. Based upon the relative position of the touch input with respect to the support object, the computing device, such as the processing circuitry, the processor or the like, may also be configured to determine the type of touch input. See block 36 of FIG. 3. In this regard, the computing device, such as the processing circuitry, the processor or the like, may be configured to determine which one or more fingers of the user contacted the touch sensitive surface 18 in order to provide the touch input with the type of touch input being defined by which finger or combination of fingers made contact with the touch sensitive surface.

In this regard, the computing device 12, such as the processing circuitry 22, the processor 24 or the like, may have been previously informed as to whether the support object 20 was to be engaged by the right hand or the left hand of the user as the type of touch input that is determined by the computing device is dependent upon the hand of the user that engages the support object. In one embodiment, the computing device, such as the processing circuitry, the processor or the like, may be configured to interpret the touch input as having been provided by fingers upon the right hand of the user unless the user has previously provided a separate input indicative of their use of their left, as opposed to their right, hand. Alternatively, different support elements may be provided for use by the user's right hand and left hand. These support objects may include different configurations of contact elements 44, such as contact elements positioned at different relative locations. As such, the computing device, such as the processing circuitry, the processor or the like, may be configured to distinguish the support object utilized by the right hand of the user relative to the support object utilized by the left handed user by a comparison of the configuration of the contact elements of the respective support object with respect to the predefined configurations of the contact elements carried by support objects that are to be utilized by the right and left hands of the user.

By way of example of the determination of the type of touch input and in conjunction with a support object 20 to be engaged by the right hand of the user, FIG. 4a illustrates five relative positions with respect to the support object that may be individually recognized by the computing device 12, such as the processing circuitry 22, the processor 24 or the like. As labeled in FIG. 4a, each region is in generally alignment with a respective fingertip of the user's hand which the user's hand rests upon the support object. In this embodiment, the computing device, such as the processing circuitry, the processor or the like, may be configured to detect and discriminate between touch input within each of the five regions relative to the support object that are depicted in FIG. 4a. Based upon which one or more regions relative to the support object received the touch input, the computing device, such as the processing circuitry, the processor or the like, may be configured to determine which one or more fingers of the users provided the touch input. The type of touch input may, in turn, be defined by the finger or combination of fingers that provide the touch input.

In regards to the determination of the type of touch input, the computing device 12 may also be configured to determine whether the touch input is stationary or involves movement across the touch sensitive surface 18. In regards to touch input that involves movement across the touch sensitive surface, the computing device may receive an indication of an initial touch input at an initial position as well as an indication of the movement of the touch input across the touch sensitive surface, such as in response to the user correspondingly moving the support object 20 relative to the touch sensitive surface while maintaining contact with the touch sensitive surface. Thus, the computing device is configured to discriminate between stationary touch input and a touch input that involves movement, each of which may be considered a different type of touch input. In one embodiment, the touch sensitive surface may also be configured to detect other parameters associated with the touch input in addition to the position of the touch input. For example, a touch sensitive surface may also detect the pressure with which the touch input is provided. As such, the computing device of this embodiment may also be configured to take into account the other parameters associated with the touch input, such as the pressure with which the touch input is provided, in determining the type of touch input.

Based upon the type of touch input, the computing device 12, such as the processing circuitry 22, the processor 24 or the like, may be configured to cause an action to be taken. In this regard, the computing device, such as the processing circuitry, the processor or the like, may be configured to take a variety of different actions depending upon the application executed by the computing device while the user is providing touch input and the type of touch input that is provided, such as depending upon which one or more fingers of the user provided the touch input and whether the touch input was stationery or involved movement across the touch sensitive surface. For example, recognition that the touch input was the result of a tap of the touch sensitive surface 18 by the index finger may result in the action associated with a left mouse button click being taken, recognition that the touch input was the result of a tap of the touch sensitive surface by the little finger may result in the action associated with a right mouse button click being taken, recognition that the touch input was the result of contact by the middle finger with the touch sensitive surface may result in a scrolling action being taken so long as the middle finger remains in contact with the touch sensitive surface and recognition that the touch input was the result of a contact by the thumb with the touch sensitive surface 18 may result in a window level (w/l) adjustment while the thumb remains in contact with the touch sensitive surface. As an additional or an alternative example of multi-touch functionality, recognition that the touch input was the result of concurrent contact by both the thumb and the index finger with the touch sensitive surface may result in a zooming action being taken so long as the thumb and the index finger remain in contact with the touch sensitive surface, and recognition that the touch input was the result of concurrent contact by both the thumb and the little finger with the touch sensitive surface may result in a panning action being taken so long as the thumb and the little finger remain in contact with the touch sensitive surface.

As described, a wide variety of touch inputs may be provided based upon user input in the form of contact between one or more of the user's fingers and the touch sensitive surface 18 relative to the position of a support object 20 upon the touch sensitive surface. As such, embodiments of the present invention provide for a large and rich set of touch inputs to be provided and distinguished so as to bring about a wide variety of different actions. Additionally or alternatively, a plurality of support objects may be provided that have different configurations of contact elements so as to permit the different support objects to be distinguished from one another. As such, input may also be provided based upon the type of support object that is positioned upon the touch sensitive surface, either with or without additional touch input provided the user, such as via contact by one or more of their fingers with the touch sensitive surface.

As shown in block 50 of FIG. 5 and as described above, the computing device 12, such as the processing circuitry 22, the processor 24 or the like, may be configured to receive input from a plurality of contact elements 40 of the support surface 44 via the touch sensitive surface 18. As also described above, the computing device, such as the processing circuitry, the processor or the like, may be configured to determine the relative positions of the contact elements of the support object. See block 52 of FIG. 5. Based upon the relative positions of the contact elements, the computing device, such as the processing circuitry, the processor or the like, may be configured to define the signature of the support object. In order to distinguish between different types of support objects, the support objects must have different configurations of contact elements. Although the support objects may have a wide variety of different configurations of contact elements including different numbers of contact elements and contact elements that are spaced apart by different widths W and lengths L, FIGS. 6a-6d illustrate four different types of support objects, each of which includes three contact elements arranged in a triangular configuration with two contact elements closer to the forward end of the support object and one contact element located closer to the rearward end of the support object in a more central position relative to the width of the support object than the contact elements proximate the forward end of the support object.

In order to permit the computing device 12, such as the processing circuitry 22, the processor 24 or the like, to distinguish between these four types of support objects 20, the configuration of the contact elements 44, such as the spacing between the contact elements, is different, either in the width W between the two contact elements closer to the forward end of the support object and/or in the length L between the two contact elements closer to the forward end of the support element and the contact element closer to the rearward end of the support object. The computing device, such as the processing circuitry, the processor, the memory 26 or the like, may be preconfigured with information defining the four different configurations of contact elements 44, thereby also defining the signature of each of the four different support objects. As such, the computing device, such as the processing circuitry, the processor or the like, may be configured to determine the relative positions of the contact elements upon the touch sensitive surface 18, thereby defining the signature of the respective support object 20. See block 52 of FIG. 5. The computing device, such as the processing circuitry, the processor or the like, may also be configured to compare the signature of the support object as defined by the configuration of the contact elements to the predefined configurations of contact elements, e.g., signatures, of the four different types of support objects. See block 54 of FIG. 5. Based upon this comparison, the computing device, such as the processing circuitry, the processor or the like, may be configured to determine which of the plurality of predefined configurations matches the configuration of the contact elements that has been detected via the touch sensitive surface. As a result, based upon the signature of the support object that is placed upon the touch sensitive surface, the computing device, such as the processing circuitry, the processor or the like, may be configured to identify the type of support object, such as by discriminating between the four different support objects of FIG. 6a-6d and identifying which particular one of those support objects is placed upon the touch sensitive surface.

In one embodiment, the touch input provided via the touch sensitive surface 18 is provided merely by the placement of one of the different types of support objects 20 upon the touch sensitive surface with different input being provided depending upon the type of support object that is recognized to be positioned upon the touch sensitive surface. In this embodiment, additional input may be provided by the position and/or orientation of the support object upon the touch sensitive surface and/or the movement of the support object relative to the touch sensitive surface. Thus, even in an instance in which the user does not provide touch input via contact of their fingers with the touch sensitive surface, the use of different types of support objects and, in some embodiments, the relative position and motion of the respective type of support objects may provide input that is recognized by the computing device, such as the processing circuitry, the processor or the like, in order to cause one or more actions to be taken.

In another embodiment, input may be provided via the touch sensitive surface 18 by a combination of the type of support object 20 that is placed upon the touch sensitive surface and touch input provided by the user via contact between one or more of their fingers and the touch sensitive surface. As such, a first set of functions may be performed by the computing device, such as the processing circuitry 22, the processor 24 or the like, in response to touch input by the user while a first type of support object is placed upon the touch sensitive surface, while a second set of functions, potentially different than the first set of functions, may be performed by the same touch inputs by the user upon the touch sensitive surface while a second type of support object is placed upon the touch sensitive surface. By permitting different functions to be performed in response to the touch input provided by the user depending upon the type of support object that is placed upon the touch sensitive surface, the computing device and associated method provide for an even greater variety of functionality to be controlled by touch input via the touch sensitive surface.

In other embodiments, input may be provided by a combination of the type of support object 20 and other forms of user input. For example, in an instance in which the support object is embodied by a computer mouse with the mouse buttons disabled, the scroll wheel or other scroll input device of the computer mouse may remain operative such that the user may provide a scrolling input with the scroll wheel or other scroll input device. Alternatively, the support object itself may include a touch sensitive surface, such as in an instance in which the support object is embodied by a computer mouse having a touch sensitive surface, such that user input may be provided via the touch sensitive surface of the support object.

The support object 20 may be configured to provide different configurations of contact elements 44 in a variety of different manners. As described above in conjunction with FIG. 6a-6d, different support objects may be provided, each of which has a different configuration of contact elements. Alternatively, a support object may be provided that has a plurality of contact elements configured in such a manner that different set of contact elements may make contact with the touch sensitive surface 18 depending upon the position of the support object relative to the touch sensitive surface. Thus, a single support object may effectively represent a plurality of different types of support objects depending upon the relative position of the support object with respect to the touch sensitive surface and, consequently, the set of contact elements that are placed into contact with the touch sensitive surface. As shown in FIGS. 7a-7c, for example, the second surface 44 of the support object may be a convex surface having a plurality of contact elements extending outwardly therefrom and arranged in different sets that may alternatively make contact with the touch sensitive surface depending upon the relative position of the support object with respect to the touch sensitive surface.

Although the convex surface 44 of the support object 20 may be curved, the support object of one embodiment may include a convex surface having a plurality of faces that are positioned at predefined angles relative to one another. As illustrated in the embodiment of FIGS. 7a-7c, the convex surface may include a first face 44a that may be centrally located and may serve as a reference for the other faces. In this regard, the support object of the illustrated embodiment may include a second face 44b proximate the rearward end of the support object that is angled upwardly away from the touch sensitive surface in an instance in which the contact elements carried by the first face are in contact with the touch sensitive surface. Correspondingly, the support object may include a third face 44c proximate the forward end of the support object that is also angled upwardly away from the touch sensitive surface in an instance in which the contact elements carried by the first face are in contact with the touch sensitive surface. Additionally, the support object of the illustrated embodiment may include fourth and fifth faces 44d and 44e that are angled both upwardly and outwardly relative to the first face in an instance in which the contact elements carried by the first face are in contact with the touch sensitive surface.

The support object 20 of this embodiment includes a plurality of contact elements 40 designated A-H with one or more of the contact elements carried by each of the faces of the convex surface 44. The contact elements are positioned such that depending upon the position of the support object with respect to the touch sensitive surface 18, such as depending upon which face of the convex surface is positioned so as to be closest to, such as in a parallel arrangement with, the touch sensitive surface, different sets of at least three contact elements contact the touch sensitive surface. As such, the plurality of contact elements may be configured so as to define a plurality of sets of contact elements with each set including at least three contact elements. Each set of contact elements is associated with a respective face such that in an instance in which the support object is positioned such that the respective face is closest to the touch sensitive surface, the set of contact elements associated with the respective face will be contact with the touch sensitive surface to the exclusion of the other contact elements. Although each set of contact elements includes a different combination of contact elements, the contact elements of each set need not be mutually exclusive. In this regard, one or more contact elements may be members of two or more sets of contact elements so long as the composition of each set of contact elements is different than every other set of contact elements. By way of example, contact elements A, B and C are associated with the first face 44a, contact elements A, D and E are associated with the second face 44b, contact elements B, C and F are associated with the third face 44c, contact elements A, B and G are associated with the fourth face 44d and contact elements A, C and H and associated with the fifth face 44e. Thus, in an instance in which the support object is positioned such that the fifth face is closest to the touch sensitive surface, contact elements A, C and H will make contact with the touch sensitive surface. Conversely, in an instance in which the support object is positioned such that the second face is positioned closest to the touch sensitive surface, contact elements A, D and E will make contact with the touch sensitive surface.

Not only is each set of contact element different in composition relative to the other sets of contact elements, but the positional configuration of the contact elements of the each set is different than the positional configuration of the contact elements of every other set, that is, the relative positions of the contact elements of each set are different than the relative positions of the contact elements of every other set. Thus, the computing device 12, such as the processing circuitry 22, the processor 24 or the like, may be configured to recognize the respective set of contact elements that is placed in contact with the touch sensitive surface based upon the positional configuration of the contact elements. Additionally, each set of contact elements may be associated with a different type of support object even though each set of contact elements is carried by the same support object. Thus, by identifying the respective set of contact elements that is placed in contact with the touch sensitive surface, the computing device, such as the processing circuitry, the processor or the like, may also be configured to correspondingly identify the type of support object that is in contact with the touch sensitive surface and may correspondingly interpret the touch input provided by the support object and/or by a user utilizing the support object in order to cause the respective action to be taken.

In regards to the recognition of a respective set of contact elements and, in turn, a particular support object, the computing device 12, such as the processing circuitry 22, the processor 24 or the like, may be configured to analyze all contact points on the touch sensitive surface and to identify a subset of the contact points that represent the respective set of contact elements of a particular support object. Thus, in an instance in which the contact points on the touch sensitive surface include not only the contact elements and related touch input, but also other contact points due to, for example, contact by the user or other objects, the computing device, such as the processing circuitry, the processor or the like, may identify the contact points attributable to the contact elements of the support object and, as a result, recognize the presence of the support object. In one embodiment, the computing device, such as the processing circuitry, the processor or the like, may be configured to recognize contact with the touch sensitive surface by the respective contact elements of two or more support objects and, as a result, may identify the presence of the plurality of support objects upon the touch sensitive surface.

Although FIGS. 7a to 7c illustrate one embodiment in which a support object 20 may include a plurality of contact elements 40 arranged in a plurality of different sets that each identify a different type of support object, other embodiments of the support object may provide comparable functionality in terms of defining a plurality of different types of support object with the same physical support object utilizing different sets of contact elements. For example, a support object may include a second surface 44 having a plurality of contact elements extending outwardly therefrom and arranged in a spiral pattern with the height of the contact elements and the spacing between the contact elements changing in a predefined manner along the spiral path. As shown in FIG. 8, for example, the contact elements 40a may have the greatest height in a central portion of the second surface and the height of the contact elements may be gradually reduced as the contact elements are positioned along the spiral path outwardly from the center of the second surface. See, for example, the relative heights of contact elements 40b, 40c, 40d and 40e which become progressively shorter further along the spiral path. Additionally, the contact elements may be grouped as a result of the spiral configuration into a plurality of different sets of three or more contact elements. The spacing between the contact elements along the spiral path may also be varied, such as by having progressively smaller spacing along the spiral path, such that each set of three or more contact elements has a different positional configuration then any of the other sets of contact elements such that the respective set of contact elements may be identified and, in turn, associated with a respective type of support object.

As a result of the different heights of the contact elements 40, the support object 20 may be positioned, such as by turning the support object in a comparable fashion as a knob, such that different sets of contact elements are placed in contact with the touch sensitive surface 18 even though the second surface 44 is not necessarily convex. In this regard, the different heights of the contact elements and the gradual reduction in the heights of the contact elements as the contact elements proceed outwardly along the spiral path permits the different sets of contact elements, generally formed by three neighboring contact elements, to be placed in contact with the touch sensitive surface without interference by any of the other contact elements, including contact elements having a greater height positioned in a more central location upon the second surface of the support object. Since each different set of contact elements of this embodiment also has a different positional configuration, the computing device 12, such as the processing circuitry 22, the processor 24 or the like, may be configured to identify the respective set of contact elements so as to define the signature of the set of contact elements and to correspondingly determine the type of support object. As such, the computing device may interpret the touch input provided by the support object, optionally in combination with touch input provided by the finger(s) of the user who is utilizing the support object, such that the corresponding action may be performed.

As another example, FIG. 9 illustrates another embodiment in which a single physical support object 20 may include a plurality of contact elements 40 arranged in a plurality of different sets that each identify a different type of support object. In this embodiment, the support object includes a second surface 44 having a plurality of contact elements extending outwardly therefrom and arranged such that each set of three (or more, although three will be described for purposes of example) adjacent contact elements defines a uniquely shaped and/or sized triangle, thereby permitting the particular set of contact elements that are in contact with the touch sensitive surface to be identified and, in turn, the corresponding support object to be recognized. The second surface may be curved so as to define, for example, a convex surface or may be faceted, such as in the manner described with respect to FIGS. 7a to 7c. In either embodiment, the second surface of the support object may positioned with respect to the touch sensitive surface such that a set of three adjacent contact elements make contact with the touch sensitive surface.

In order to insure that the contact elements 40 are arranged such that each set of three adjacent contact elements defines a uniquely shaped and/or sized triangle, the spacing of the contact elements on the opposite sides of the centerline A-A is different. As shown in FIG. 9, for example, 1A is not equal to 1B, 2A is not equal to 2B and 3A is not equal to 3B. Additionally, the angular position of the contact elements on the opposite sides of the centerline relative to the contact elements along the centerline may be different. For example, the position of the contact elements may differ on the opposite sides of the centerline in an embodiment in which the interior angle defined between imaginary line segments L and M is different than the interior angle defined between imaginary line segments N and O. Since each different set of contact elements of this embodiment also has a different positional configuration, the computing device 12, such as the processing circuitry 22, the processor 24 or the like, may be configured to identify the respective set of contact elements so as to define the signature of the set of contact elements and to correspondingly determine the type of support object 20. As such, the computing device may interpret the touch input provided by the support object, optionally in combination with touch input provided by the finger(s) of the user who is utilizing the support object, such that the corresponding action may be performed.

As such, the computing device 12, support object 20 and associated method of embodiments of the present invention permit a wide and rich variety of user input to be provided. As such, the computing device may be configured to perform a wide variety of different functions in one or more applications based upon the user input. However, by permitting the user to place at least a portion of their hand upon the support object while providing the input via touch sensitive surface, the user may provide input for an extended period of time without appreciable fatigue or other discomfort. Additionally, the computing device, support object and associated method of an example embodiment may maintain backward compatibility with a conventional computer mouse having two or three buttons and a scroll wheel.

As described above, FIGS. 3 and 5 illustrate flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices 26 of a computing device 12 and executed by processing circuitry 22 in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processing circuitry 22 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of receiving touch input from a user who engages and moves a support object relative to a touch sensitive surface, wherein the support object is independently movable relative to the touch sensitive surface, and wherein the method comprises:

determining an orientation of the support object upon the touch sensitive surface while the support object overlies a portion of the touch sensitive surface, wherein the support object includes an asymmetrical pattern of contact elements that are in contact with the touch sensitive surface, and wherein determining the orientation of the support object comprises determining a location of a forward end of the support object relative to a rearward end of the support object based upon the asymmetrical pattern of the contact elements;

while the support object is in contact with the touch sensitive surface and while the user has placed a hand upon the support object such that at least one finger of the hand extends beyond the forward end of the support object and contacts the touch sensitive surface and such that a wrist and forearm of the user extend from the rearward end of the support object, receiving the touch input from the at least one finger of the user as a result of contact between the at least one finger with the touch sensitive surface at a positon upon the touch sensitive surface that is outside of the portion of the touch sensitive surface that the support object overlies so as to be located beyond an edge of the support object and to be distinct and spaced apart from the contact elements of the support object;

after having determined the orientation of the support object upon the touch sensitive surface, determining a relative position of the touch input with respect to the support object based upon the orientation of the support object upon the touch sensitive surface;

determining, with processing circuitry, a type of touch input based upon the relative position of the touch input with respect to the support object; and causing an action to be taken in response to the type of touch input.

2. A method according to claim 1 wherein receiving the touch input comprises receiving an initial touch input followed by movement of the touch input over the touch sensitive surface as a result of corresponding movement of the support object.

3. A method according to claim 1 wherein receiving the touch input comprises receiving the touch input comprised of touch input components concurrently provided by two or more fingers of the user upon the touch sensitive surface.

4. An apparatus for receiving touch input from a user who engages and moves a support object relative to a touch sensitive surface, wherein the support object is independently movable relative to the touch sensitive surface, and wherein the apparatus comprises processing circuitry configured to:

determine an orientation of the support object upon the touch sensitive surface while the support object overlies a portion of the touch sensitive surface, wherein the support object includes an asymmetrical pattern of contact elements that are in contact with the touch sensitive surface, and wherein the orientation of the support object is determined by determining a location of a forward end of the support object relative to a rearward end of the support object based upon the asymmetrical pattern of the contact elements;

while the support object is in contact with the touch sensitive surface and while the user has placed a hand upon the support object such that at least one finger of the hand extends beyond the forward end of the support object and contacts the touch sensitive surface and such that a wrist and forearm of the user extend from the rearward end of the support object, receive the touch input from the at least one finger of the user as a result of contact between the at least one finger with the touch sensitive surface at a positon upon the touch sensitive surface that is outside of the portion of the touch sensitive surface that the support object overlies so as to be located beyond an edge of the support object and to be distinct and spaced apart from the contact elements of the support object;

after having determined the orientation of the support object upon the touch sensitive surface, determine a relative position of the touch input with respect to the support object based upon the orientation of the support object upon the touch sensitive surface;

determine a type of touch input based upon the relative position of the touch input with respect to the support object; and cause an action to be taken in response to the type of touch input.

5. A computer program product comprising a non-transitory computer readable storage medium having program code portions stored thereon, the program code portions configured, upon execution by the processing circuitry, to cause the method of claim 1 to be performed.

6. A method of identifying a type of support object upon a touch sensitive surface, wherein the support object is independently movable relative to the touch sensitive surface, and wherein the method comprises:

receiving input from a plurality of contact points of the support object via the touch sensitive surface;

determining relative positions of the contact points of the support object in order to define a signature of the support object, wherein the support object is one of a plurality of types of support objects with each type of support object having differently positioned contact points that define a different signature;

identifying, with processing circuitry, the type of support object based upon the signature of the support object;

receiving input from a finger of the user as a result of contact between the finger with the touch sensitive surface while the user has placed a hand including the finger upon the support object, wherein the input from the finger is distinct and spaced apart from the contact points of the support object; and causing an action to be taken in response to the input, wherein the action to be taken is dependent upon both the input that is received and the type of support object that is identified such that different types of support objects as identified based upon the respective signatures cause different sets of functions to be performed in response to receipt of a same input from the finger of the user.

7. A method according to claim 6 further comprising:
determining a type of touch input based upon the relative position of the touch input with respect to the support object.

8. A method according to claim 7 further comprising determining an orientation of the support object based upon the relative positions of the contact points.

9. A method according to claim 8 wherein determining the type of touch input comprises determining the type of touch input based upon the relative position of the touch input with respect to the support object and its orientation.

10. A method according to claim 6 further comprising:
receiving touch input via a touch surface carried by the support object; and
causing an action to be taken in response to the touch input.

11. An apparatus comprising the processing circuitry configured to perform the method of claim 6.

12. A computer program product comprising a non-transitory computer readable storage medium having program code portions stored thereon, the program code portions configured, upon execution by the processing circuitry, to cause the method of claim 6 to be performed.

13. An apparatus according to claim 4 wherein the processing circuitry is configured to receive the touch input by receiving an initial touch input followed by movement of the touch input over the touch sensitive surface as a result of corresponding movement of the support object.

14. An apparatus according to claim 4 wherein the processing circuitry is configured to receive the touch input by receiving the touch input comprised of touch input components concurrently provided by two or more fingers of the user upon the touch sensitive surface.

* * * * *